United States Patent
Lane et al.

(10) Patent No.: US 8,591,103 B2
(45) Date of Patent: *Nov. 26, 2013

(54) MULTI-SITE INFRARED THERMOMETER

(75) Inventors: John A. Lane, Weedsport, NY (US);
David E. Quinn, Auburn, NY (US)

(73) Assignee: Welch Allyn, Inc., Skaneateles Falls, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/869,154

(22) Filed: Aug. 26, 2010

(65) Prior Publication Data

US 2010/0322282 A1    Dec. 23, 2010

Related U.S. Application Data

(63) Continuation of application No. 11/678,657, filed on Feb. 26, 2007, now Pat. No. 7,815,367, which is a continuation-in-part of application No. 10/989,631, filed on Nov. 16, 2004, now Pat. No. 7,572,056.

(51) Int. Cl.
*G01J 5/00* (2006.01)
*G01K 1/00* (2006.01)
*A61B 5/00* (2006.01)

(52) U.S. Cl.
USPC ........... 374/131; 374/130; 374/121; 374/208; 374/126; 600/474; 600/549

(58) Field of Classification Search
USPC .......... 374/130, 121, 126, 208, 131; 600/474, 600/549
See application file for complete search history.

(56) References Cited

U.S. PATENT DOCUMENTS

| | | | |
|---|---|---|---|
| 1,363,259 A | 12/1920 | Mills | |
| 3,533,399 A | 10/1970 | Goldberg et al. | |
| 3,626,757 A | 12/1971 | Benzinger | |
| 3,626,758 A * | 12/1971 | Stewart et al. | 374/129 |
| 3,703,892 A | 11/1972 | Meyers | |
| 3,738,173 A | 6/1973 | Sato | |
| 3,738,479 A | 6/1973 | Sato | |
| 3,837,772 A | 9/1974 | Van de Walker et al. | |
| 3,880,282 A | 4/1975 | Naumann | |

(Continued)

FOREIGN PATENT DOCUMENTS

| | | |
|---|---|---|
| EP | 0 072 185 A2 | 2/1983 |
| FR | 2851333 A1 | 8/2004 |

(Continued)

OTHER PUBLICATIONS

International Search Report for International Application No. PCT/US2005/038936, Mailed May 4, 2006, (3 pages).

(Continued)

*Primary Examiner* — Mirellys Jagan
(74) *Attorney, Agent, or Firm* — Hiscock & Barclay, LLP

(57) ABSTRACT

An infrared thermometer includes a probe and an infrared sensor. The probe with an infrared target absorbs thermal radiation to provide a substantially consistent source of infrared radiation and an aperture for preventing contamination of the infrared target while permitting the transmission of thermal radiation to the target. The infrared sensor is configured for sensing infrared radiation from the infrared target. The infrared target is positioned within the probe such that it absorbs thermal radiation that comes from the aperture and thereafter emits thermal radiation to the infrared sensor.

9 Claims, 7 Drawing Sheets

(56) References Cited

U.S. PATENT DOCUMENTS

| | | |
|---|---|---|
| 3,999,434 A | 12/1976 | Yen |
| 4,008,614 A | 2/1977 | Turner |
| 4,054,057 A | 10/1977 | Kluge et al. |
| 4,086,813 A | 5/1978 | Meek et al. |
| 4,112,762 A | 9/1978 | Turner |
| 4,343,185 A | 8/1982 | Knute |
| 4,433,637 A | 2/1984 | Buirley et al. |
| 4,457,633 A | 7/1984 | Andrews |
| 4,528,986 A * | 7/1985 | Arundel et al. ............... 600/476 |
| 4,588,306 A | 5/1986 | Burger et al. |
| 4,859,079 A | 8/1989 | Wickersheim et al. |
| 5,017,018 A * | 5/1991 | Iuchi et al. .................... 374/130 |
| 5,159,936 A | 11/1992 | Yelderman et al. |
| 5,165,798 A | 11/1992 | Watanabe |
| 5,169,234 A | 12/1992 | Bohm |
| 5,325,863 A | 7/1994 | Pompei |
| 5,340,215 A | 8/1994 | Makita et al. |
| 5,645,349 A | 7/1997 | Fraden |
| 5,678,566 A | 10/1997 | Dribbon |
| 5,874,736 A | 2/1999 | Pompei |
| 5,893,833 A | 4/1999 | Pompei et al. |
| 5,983,124 A | 11/1999 | Carr |
| 6,036,361 A | 3/2000 | Gregory et al. |
| 6,045,257 A | 4/2000 | Pompei et al. |
| D423,956 S | 5/2000 | Chen |
| 6,056,435 A | 5/2000 | Pompei |
| 6,077,228 A | 6/2000 | Schonberger |
| 6,086,247 A | 7/2000 | von Hollen |
| 6,129,673 A | 10/2000 | Fraden |
| 6,191,339 B1 | 2/2001 | Gueret |
| 6,241,384 B1 | 6/2001 | Pompei et al. |
| 6,292,685 B1 | 9/2001 | Pompei |
| 6,299,347 B1 | 10/2001 | Pompei |
| 6,347,243 B1 | 2/2002 | Fraden |
| 6,390,671 B1 | 5/2002 | Tseng |
| 6,402,371 B2 | 6/2002 | Pompei et al. |
| 6,447,160 B1 | 9/2002 | Fraden |
| 6,461,037 B1 | 10/2002 | O'Leary |
| 6,499,877 B2 | 12/2002 | Pompei |
| 6,527,439 B1 | 3/2003 | Bellifemine |
| 6,569,189 B1 | 5/2003 | Augustine et al. |
| 6,595,911 B2 | 7/2003 | LoVuolo |
| 6,604,854 B1 | 8/2003 | Limburg et al. |
| 6,609,823 B2 | 8/2003 | Kraus et al. |
| 6,629,776 B2 | 10/2003 | Bell et al. |
| 6,709,154 B1 | 3/2004 | Janotte |
| 6,742,927 B2 | 6/2004 | Bellifemine |
| 6,751,497 B2 | 6/2004 | Fraden |
| 6,789,936 B1 | 9/2004 | Kraus et al. |
| 6,830,549 B2 | 12/2004 | Bui et al. |
| 6,963,772 B2 | 11/2005 | Bloom et al. |
| 7,037,083 B2 | 5/2006 | O'Neil et al. |
| 7,048,437 B2 | 5/2006 | Bellifernine |
| 7,187,960 B2 | 3/2007 | Abreu |
| 7,213,969 B2 | 5/2007 | Russak et al. |
| 7,490,575 B2 | 2/2009 | Taylor et al. |
| 7,572,056 B2 | 8/2009 | Lane et al. |
| 7,597,668 B2 | 10/2009 | Yarden |
| 7,815,367 B2 | 10/2010 | Lane et al. |
| 2002/0017997 A1 | 2/2002 | Felkowitz |
| 2002/0172257 A1 | 11/2002 | Walls et al. |
| 2003/0149349 A1 | 8/2003 | Jensen |
| 2003/0210146 A1 | 11/2003 | Tseng |
| 2004/0076217 A1 | 4/2004 | Lin |
| 2004/0215098 A1 | 10/2004 | Barton et al. |
| 2005/0245839 A1 | 11/2005 | Stivoric et al. |
| 2005/0254549 A1 | 11/2005 | Harr |
| 2006/0062274 A1 | 3/2006 | Pompei |
| 2006/0106365 A1 | 5/2006 | Lane et al. |
| 2006/0153278 A1 | 7/2006 | Chen et al. |
| 2007/0189358 A1 | 8/2007 | Lane et al. |
| 2008/0071189 A1* | 3/2008 | Yarden et al. ................. 600/549 |
| 2008/0137709 A1 | 6/2008 | Quinn et al. |
| 2008/0161715 A1 | 7/2008 | Stivoric et al. |
| 2009/0010998 A1 | 1/2009 | Marchitto et al. |

FOREIGN PATENT DOCUMENTS

| | | |
|---|---|---|
| GB | 2075194 A | 11/1981 |
| JP | 02162220 A | 6/1990 |
| JP | 03095422 A | 4/1991 |
| JP | 03279826 A | 12/1991 |
| JP | 04283632 A | 10/1992 |
| WO | WO92/10133 A1 | 6/1992 |
| WO | WO 2005/112547 A2 | 12/2005 |
| WO | WO206/055214 A1 | 5/2006 |
| WO | WO2008/105869 A1 | 9/2008 |
| WO | WO2009/051863 A1 | 4/2009 |

OTHER PUBLICATIONS

International Search Report and Written Opinion for International Application No. PCT/US2005/038936, mailed May 31, 2007 (7 pages).

International Search Report and Written Opinion for International Application No. PCT/US2008/068004, mailed Jan. 20, 2009 (12 pages).

Extended European Search Report for EP Application No. 08 771 811.0; mailed Mar. 8, 2013; 7 pages.

European Office Action for EP 08 771 811.0; dated Aug. 22, 2013; 2 pages.

\* cited by examiner

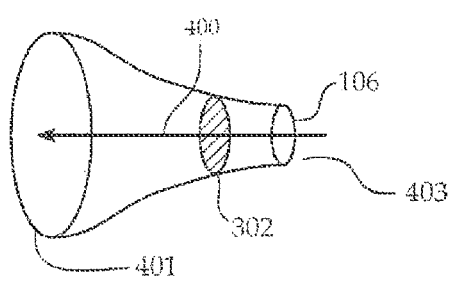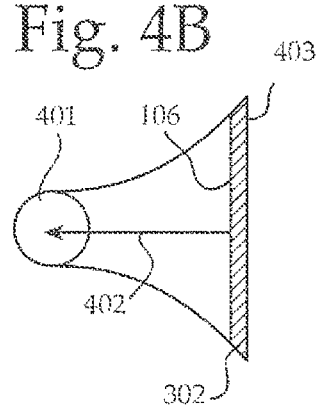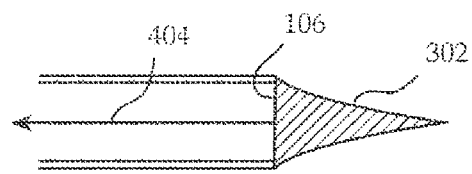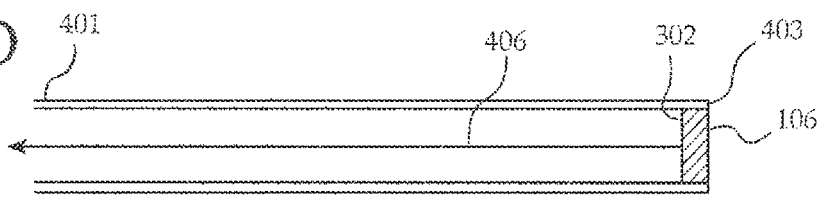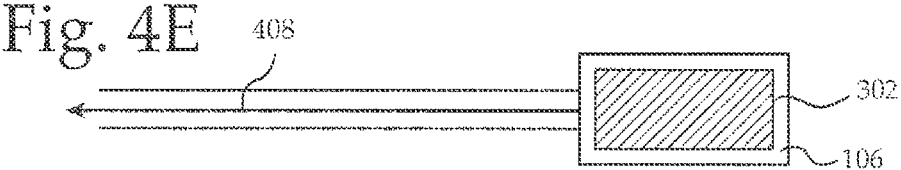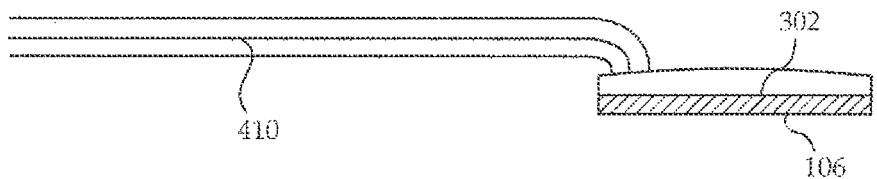

MULTI-SITE INFRARED THERMOMETER

CROSS-REFERENCE TO RELATED APPLICATIONS

This application is a continuation patent application of, and claims priority and benefit to, co-pending U.S. patent application Ser. No. 11/678,657, that was filed on Feb. 26, 2007 and entitled "Multi-Site Infrared Thermometer", which is a continuation-in-part application of, and claims the priority and benefit to, U.S. patent application Ser. No. 10/989,631 that was filed Nov. 16, 2004, entitled "Probe Cover for Thermometry Apparatus", and now issued U.S. Pat. No. 7,572,056. The patent application is related to U.S. patent application Ser. No. 11/873,046, entitled "Temperature Patch and Method of Using the Same". All of the aforementioned patent applications and patents are incorporated herein by reference in their entirety.

FIELD OF THE INVENTION

This invention relates, in one embodiment, to an infrared thermometer with multiple disposable probes. The thermometer automatically detects which of the multiple probes is currently attached, loads a predetermined program from memory that corresponds to the current probe, and thereafter obtains a temperature measurement from a patient using infrared radiation conducted or emitted therefrom.

BACKGROUND OF THE INVENTION

It has been a longstanding objective in the art to rapidly and accurately measure the temperature of a patient. The core temperature of a mammal may be approximately measured in a number of ways. For example, typical temperature measuring techniques use specialized probes such as oral, rectal, axillary, and/or tympanic probes to measure the temperature of a specific area of the body. The body's "core temperature" may then be extrapolated from such a measurement. Reference may be had to U.S. Pat. No. 6,292,685 to Pompei (Temporal Artery Temperature Detector). Each of the aforementioned probes is useful under different circumstances. For example, axillary probes are particularly useful in conjunction with neonates, whereas tympanic infrared probes are widely used on adults.

The use of tympanic infrared probes on adults has proven to be particularly useful. One of the primary advantages of such probes is their speed—a typical infrared probe can measure the temperature of the tympanic membrane in less than one second. In contrast, a mercury oral thermometer often takes several minutes to provide a proper measurement. Examples of tympanic infrared probes include U.S. Pat. No. 5,159,936 to Yelderman et al. (Noncontact Infrared Tympanic Thermometer) and U.S. Pat. No. 6,609,823 to Kraus et al. (Infrared Radiation Thermometer with Variable Exterior Probe Head for Conforming to Body Cavity). Such tympanic infrared thermometers are readily commercially available. For example, the Braun Pro4000, available from Welch Allyn, provides such an infrared probe, complete with a disposable, sanitary cover.

The use of infrared axillary probes is also known in the art. Reference may be had to U.S. Pat. Nos. 5,874,736; 5,893,833; 6,045,257; 6,056,435; 6,241,384; 6,299,347; 6,402,371; and 6,499,877 to Pompei et al.

Unfortunately, other bodily sites are not so suitable for infrared temperature measurement. For such other sites, traditional thermometers, which require long equilibration times, are often used to measure temperatures. Traditional thermometers include those materials, both liquid and solid, that expand or otherwise change their physical confirmation when heated. Examples include mercury and ethanol based thermometers. It would be a significant advantage if medical personnel could quickly measure body temperature at multiple locations using infrared technology. It would be a further advantage if medical personnel could use a single infrared thermometer to obtain temperature measurements at multiple sites.

U.S. Pat. No. 6,789,936 to Kraus et al. (Infrared Thermometer for Performing Temperature Measurements at Different Sites) provides a device capable of measuring body temperature using either temporal or tympanic probes. Although Kraus discusses the desirability of obtaining infrared temperature readings from other bodily sites, obtaining such measurements has proven problematic. The device of Kraus is deficient in that it does not describe a mechanism or method for enabling an infrared temperature reading from the sites most commonly used by healthcare professionals, particularly oral, rectal and axillary sites. Conversions to derive readings similar to these sites are discussed but such conversions are found to work only in general and are not sufficiently accurate for individual subjects.

Additional background references that are of some importance, while not material to the present claims, include U.S. Pat. No. 5,169,234 to Bohm (Infrared Temperature Sensor); U.S. Pat. No. 6,129,673 to Fraden (Infrared Thermometer); U.S. Pat. No. 6,347,243 to Fraden (Probe Cover for Infrared Thermometer); U.S. Pat. No. 6,390,671 to Tseng (Probe Cover with Film Insert); U.S. Pat. No. 6,447,160 to Fraden (Blackbody Cavity for Calibration of Infrared Thermometers); U.S. Pat. No. 6,527,439 to Bellifemine (Infrared Thermometer); U.S. Pat. No. 6,709,154 to Janotte (Radiation Thermometer and Radiation Sensor with Several Sensor Elements, Method for Determining Temperature); U.S. Pat. No. 6,742,927 to Bellifemine (Infrared Thermometer); U.S. Pat. No. 6,751,497 to Fraden (Infrared Thermometer); and U.S. Pat. No. 7,048,437 to Bellifermine (Infrared Thermometer and Waveguide for Infrared Thermometer).

Therefore, an infrared thermometer is desired which permits the user to rapidly measure body temperature at multiple sites using a single device.

Furthermore, an infrared thermometer is desired which automatically detects what type of probe is connected to the thermometer and thereafter loads a program that permits the thermometer to properly interpret data from such a probe.

SUMMARY OF THE INVENTION

The invention comprises, in one form thereof, a kit comprising an infrared thermometer and at least two probes for use with the thermometer. The probes are each equipped with keying features that mate with one or more switches on the thermometer and permit the thermometer to properly identify which of the probes is currently attached.

An advantage of the present invention is that the probes are especially configured to provide a substantially consistent source of infrared radiation to the sensor, regardless of where the probe is disposed.

BRIEF DESCRIPTION OF THE DRAWINGS

The present invention is disclosed with reference to the accompanying drawings, wherein:

FIG. 4A to 4F are illustrations of various probes for use with this invention;

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
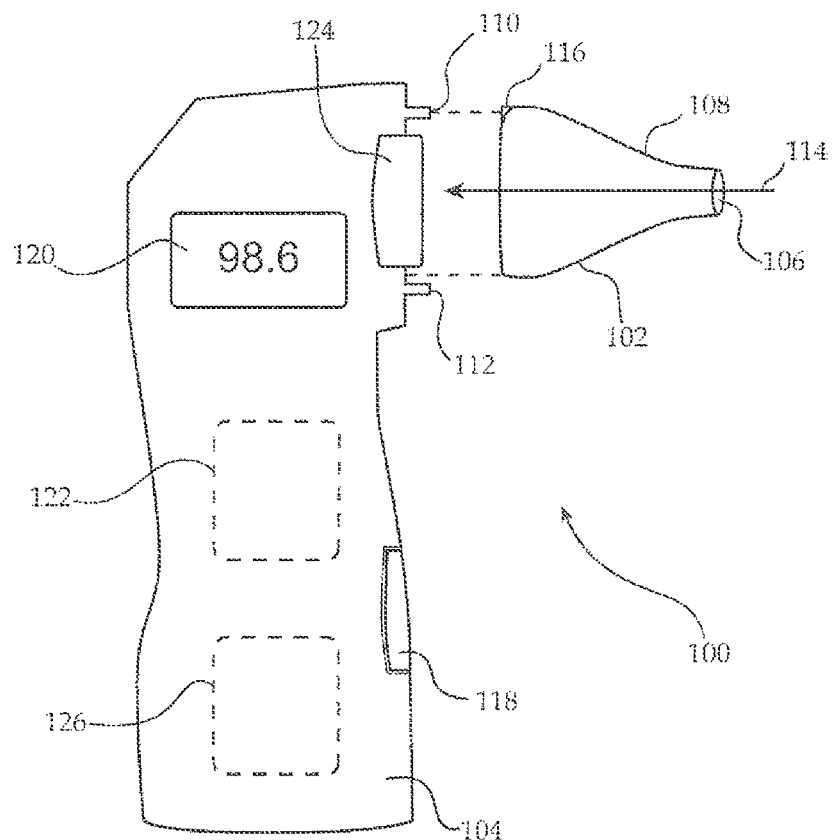
FIG. 1 is a schematic depiction of an infrared (IR) thermometer assembly for use with the present invention.

FIG. 1 is a schematic depiction of infrared (IR) thermometer assembly 100. Assembly 100 is comprised of infrared thermometer 104 and probe 102. Infrared thermometer 104 is similar to prior art infrared thermometers and may be used in an analogous manner. For example, when in use on a patient, probe 102 is disposed over infrared sensor 124. The probe 102 is then placed at a bodily location for which probe 102 is specifically configured. In the embodiment depicted in FIG. 1, probe 102 is a tympanic probe configured to receive temperature readings from within a patient's ear. Once the probe is suitably disposed, activation button 118 is pressed and a temperature reading is obtained. Infrared radiation 114 passes through infrared transparent aperture 106 and strikes infrared sensor 124. Infrared opaque wall 108 helps reduce the exposure of sensor 124 to the environment, thus reduces background noise and other interference. Infrared sensor 124 generates a signal that corresponds to the amount of infrared radiation received. This signal is processed by processor 112 in accordance with certain instructions (e.g. a program) contained within data storage device 126. In this manner, a patient's temperature is calculated based upon the aforementioned signal and is thereafter displayed in digital display 120. As would be appreciated by one skilled in the art, a different probe may require an alternate program to properly calculate a patient's temperature. A similar device is disclosed in U.S. Pat. No. 6,789,936 to Kraus et al. (Infrared Thermometer for Performing Temperature Measurements at Different Sites).

The device of Kraus permits a program to be automatically loaded into the processor based upon which one of two probes is disposed over the infrared sensor and which one of two switches is depressed. In the embodiment depicted in FIG. 1, probe 102 is comprised of a first key 116. As used herein, the term "key" refers to any suitable structural feature of a probe for selectively activating one or more switches located on the thermometer. When probe 102 is securely in its proper position over sensor 124, first switch 110 is depressed by first key 116, but second switch 112 is not depressed. When first switch 110 is depressed, but second switch 112 is not so depressed, then a first program is loaded from data storage device 126 into processor 112. This first program contains the instructions necessary for processor 122 to properly calculate the patient's temperature using probe 102. A probe other than probe 102 may require a different program to properly read the patient's temperature. Such a second probe is illustrated in FIG. 2.

Figure 2:
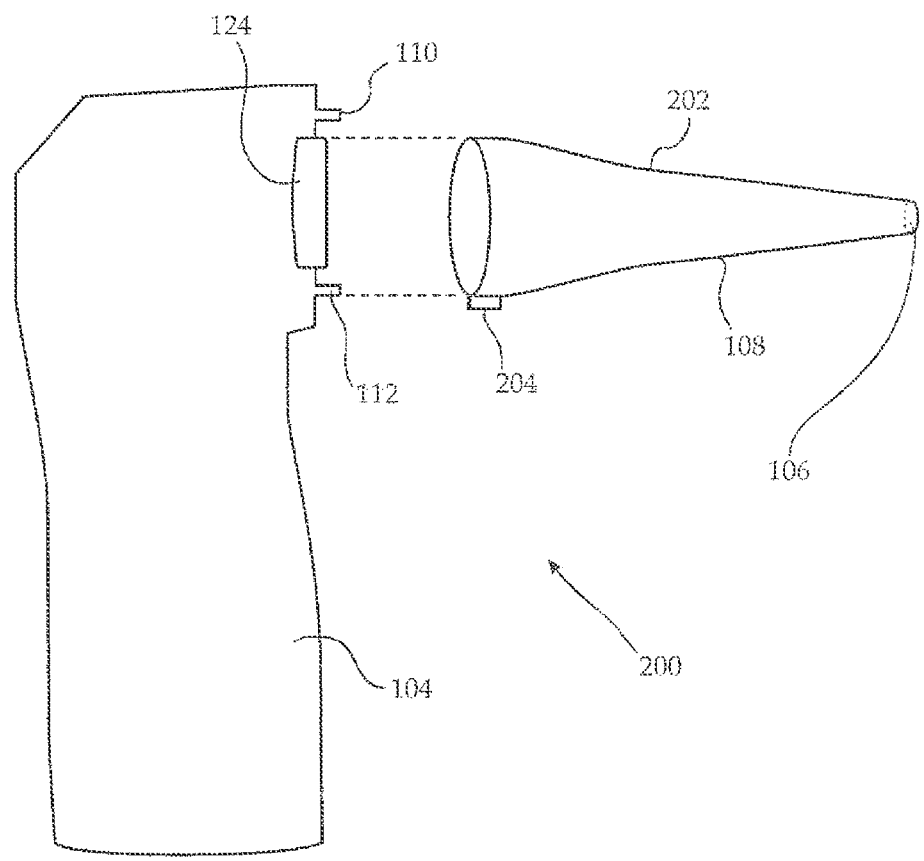
FIG. 2 is a schematic depiction of an IR thermometer wherein a different probe is used.

FIG. 2 is a depiction of assembly 200 which is substantially similar to assembly 100 of FIG. 1 except in that probe 202 has replaced probe 102. Probe 202 is an oral or rectal probe configured to receive temperature readings from within a patient's mouth or rectum. Probe 202 is comprised of second key 204. When probe 202 is securely in its proper position over sensor 124, first switch 110 is not depressed, but second switch 112 is depressed by second key 204. When first switch 110 is not depressed, but second switch 112 is depressed, then a second program is loaded from data storage device 126 into processor 112. This second program contains the instructions necessary for processor 122 to properly calculate the patient's temperature using probe 202.

The device of Kraus permits two probes to be automatically detected using the aforementioned switches. In the present invention, other switch configurations, beyond those taught by Kraus, are also possible that permit more than two probes. For example, when neither switch 110 nor switch 112 are depressed, then a third program may be loaded. When both switch 110 and switch 112 are depressed, then a fourth program may be loaded. Should three or more switches be present, a multiplicity of probes may be automatically detected by selectively depressing certain combinations of switches.

While the device of Kraus permits the detection of multiple probes, its use has been limited by the applicability of infrared technology to other bodily sites. For example, infrared temperature measurements are adaptable to measuring temperature at the tympanic membrane, at the axilla, or at the temporal region, but are poorly suited to measure temperature orally or rectally. For an infrared sensor to accurately measure the temperature at a specific bodily site a substantially consistent source of infrared radiation should be provided. The properties of the tympanic membrane inherently provide such a substantially consistent environment, thus tympanic probes have found widespread acceptance in the medical industry. The axilla may also provide a similarly consistent environment, if the medical practitioner can avoid disrupting the thermal equilibrium of the axilla during placement of the thermometer and if the effects of ambient infrared radiation and emmissivity are accounted for. The temporal region can potentially provide a substantially consistent source of infrared radiation, but such temporal probes likewise require a fair amount of skill on the part of the medical practitioner and proper conditioning of the temporal site. In contrast, the oral and rectal environments do not provide a substantially consistent source of infrared radiation due to difficulty of access and variable surface conditions from subject to subject. In one aspect of the present invention, a probe is provided that is adapted to measure temperature both orally and rectally by providing an indirect source of infrared radiation—radiation from a target of known infrared properties. Such a target may receive thermal energy from the patient by direct conductance or by transmission of infrared radiation through the air. The underlying principle of such a target is illustrated in FIG. 3.

Figure 3:
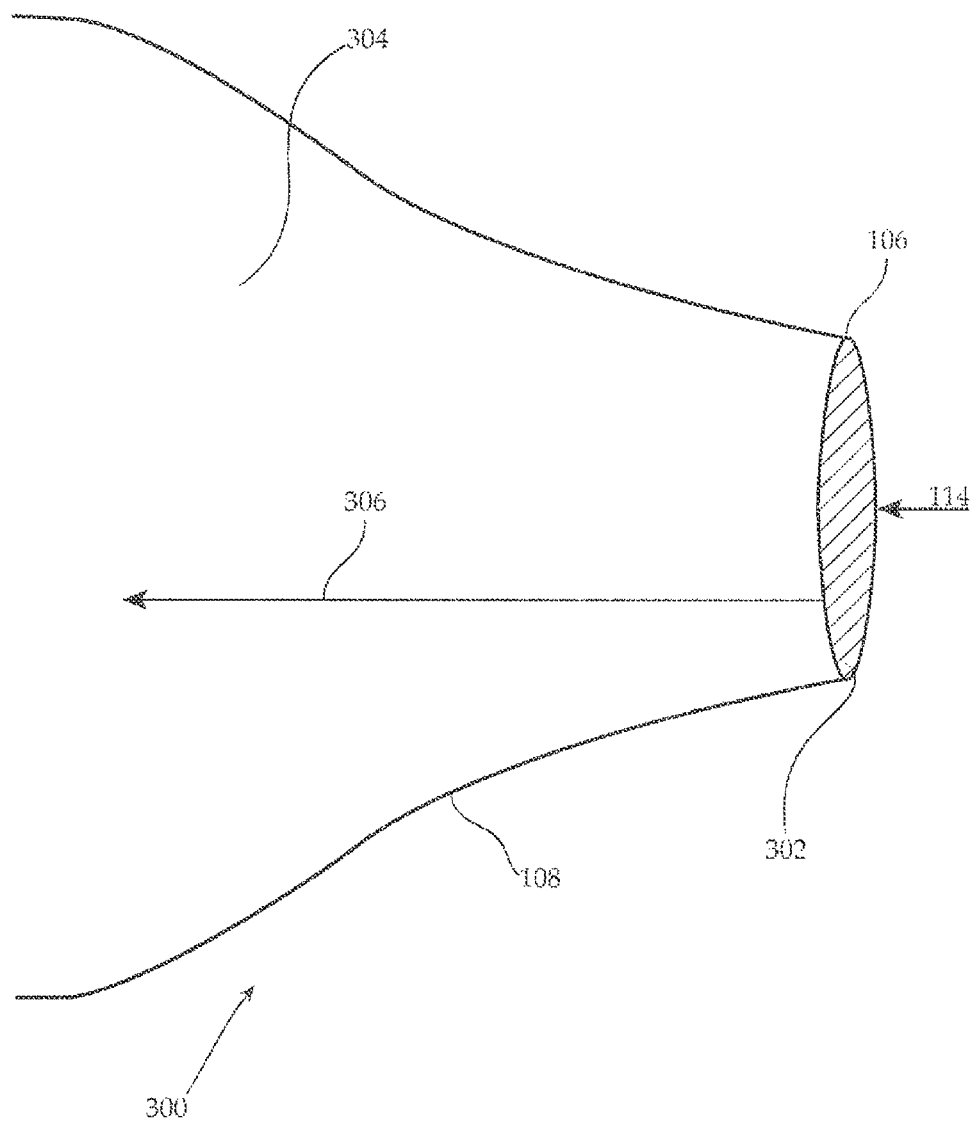
FIG. 3 is a more detailed view of the terminus of one probe for use with the present invention.

FIG. 3 is a depiction of distal end 300 of one probe for use with the present invention. The probe illustrated in FIG. 3 depicts an infrared target 302 that advantageously provides a substantially consistent source of infrared radiation for the sensor 124 (see FIG. 1) to measure. Distal end 300 is comprised of infrared opaque wall 108 which surrounds and encloses lumen 304. Wall 108 helps protect the sensor 124 from infrared noise that may be present in the environment. Wall 108 may be made of any suitable infrared opaque material. For example, wall 108 may be comprised of a material selected from the group consisting of treated paper, plastic, and a polished metal. The paper is preferably treated so as to make it more rigid, add a moisture barrier, and to control infection. Suitable plastics include polyethylene, polypropylene, and starched based polymers. Suitable metals include aluminum, gold, and gold plated substrates.

Referring again to FIG. 3, distal end 300 terminates in infrared transparent aperture 106. In one embodiment, aperture 106 is a simple hole that permits target 302 to be in direct contact with the outside environment. In another embodiment, shown in FIG. 4A, aperture 106 includes a physical membrane that permits the transmission of thermal radiation to target 302, but prevents contamination of target 302 with debris. Suitable membranes are known in the art. For example, such a membrane may be comprised of polyethylene, polypropylene, starched based polymers, and the like. Reference may be had to U.S. Pat. No. 6,390,671 to Tseng (Probe Cover with Film Insert).

Referring again to FIG. 3, disposed within lumen 304 is infrared target 302. Target 302 is disposed near aperture 106 such that thermal radiation 114 passes through aperture 106 and heats target 302 by conduction. In this manner, target 302 absorbs thermal radiation. Target 302 thereafter emits infrared radiation 306 that passes through lumen 304 and is later detected by sensor 124. Target 302 is any suitable high emissivity material. As used in this specification, the term "emissivity" is given the same meaning as defined and claimed in U.S. Pat. No. 7,037,083 to O'Neil (Radiation Shielding Coating). In one embodiment, the emissivity of the target 302 is at least about 0.8. In another embodiment, the emissivity of the target 302 is at least about 0.9. In yet another embodiment, the emissivity of the target is at least about 0.95. Target 302 may be comprised of any suitable material known in the art. In one embodiment, target 302 consists of a material selected from the group consisting of plastic, cellulose paper, fabric, metal foil, and combinations thereof. Examples of suitable metals include aluminum, brass, copper, gold, and the like. Many probes may be constructed in accordance with the aforementioned teachings. Some of these probes are illustrated in FIGS. 4A to 4F.

FIGS. 4A to 4F are depictions of various probes for use with the present invention. Each of these probes find particular utility in particular circumstances.

FIG. 4A is a tympanic probe for use with the present invention. A tympanic probe is any probe configured to be disposed with an ear. Tympanic probes typically have a proximal end 401 and a distal end 403, wherein the diameter of the proximal end 401 is greater than the diameter of the distal end 403. In the embodiment depicted in FIG. 4A, thermal radiation is transmitted to target 302 through the air. Radiation 400 thereafter is emitted by target 302 and travels to sensor 124 (see FIG. 1).

FIG. 4B is a temporal probe for use with the present invention. A temporal probe is any probe configured to obtain a temperature measurement from the temple region of a mammal. Temporal probes may have a variety of configurations, only one of which is illustrated in FIG. 4B. In the embodiment depicted in FIG. 4B, proximal end 401 has a diameter which is less than the diameter of distal end 403. In FIG. 4B target 302 is in direct contact with the region whose temperature is to be measured and thus conducts thermal energy from such region to target 302. Radiation 402 thereafter is emitted by target 302 and travels to sensor 124 (see FIG. 1).

FIG. 4C is a depiction of a probe that is suitable for use as an oral, rectal or axillary probe. An oral probe is any probe configured to obtain a temperature measurement from the mouth, and in particular from the sublingual region of the mouth. Such probes may also be suitable for obtaining both rectal and axillary temperature measurements. In the embodiment depicted in FIG. 4C, aperture 106 is a simple hole. Target 302 protrudes through aperture 106 and is in direct contact with the environment. Thermal radiation from the environment is absorbed by target 302 and is thereafter emitted as radiation 404.

FIG. 4D is a simple probe wherein the proximal end 401 has the same diameter as the distal end 403. In the embodiment depicted in FIG. 4D, target 302 is configured to be in direct contact with the environment and the energy passes through aperture 106 by conductance. Target 302 is disposed within the lumen of the probe. Thermal radiation passes through aperture 106 and is absorbed by target 302. Radiation 406 is thereafter emitted by target 302 and detected by sensor 124 (see FIG. 1).

FIG. 4E is a bottom view of a probe suitable for use as an axillary probe. FIG. 4F is a side view of the probe of FIG. 4E. The probe illustrated in FIG. 4E is a substantially flat or planar surface that is configured to be disposed on the skin of a mammal, such as, for example, in a patient's axilla. Thermal energy is then transferred from the environment to target 302 and is thereafter emitted as radiation 408 that is detected by sensor 124 (see FIG. 1). In one embodiment, waveguide 410 (see FIG. 4F) facilitates the transfer of the infrared radiation along the length of the lumen.

Figure 5A:
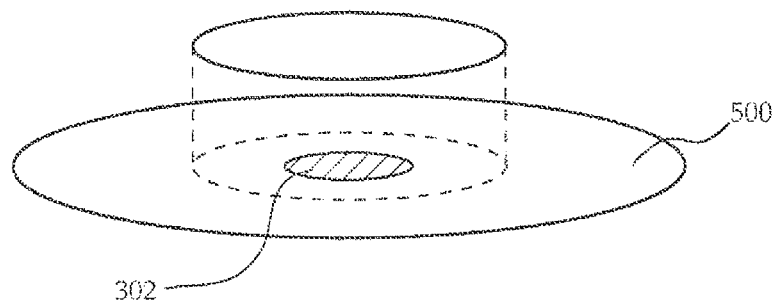
FIGS. 5A and 5B are depictions of an infrared target configuration for use with the present invention.
Figure 5B:
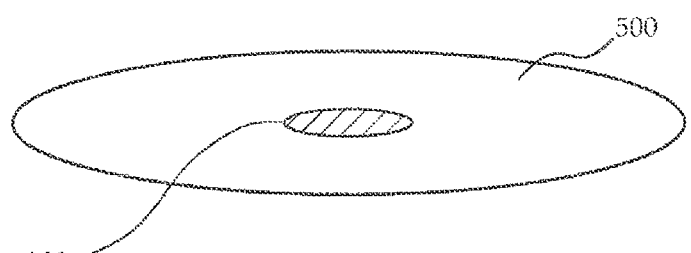

In each of the aforementioned probes, it is preferred that the target 302 have certain properties. For example, is it preferred that target 302 have a relatively high emissivity. Moreover, it is preferred that such probes be disposable. Disposable probes are advantaged in that they help maintain a sanitary environment. Additionally, it is also preferred that target 302 be adapted to quickly absorb infrared radiation upon exposure to such radiation. One factor that influences the rate of heating of target 302 is the mass of target 302. It is preferred that target 302 be of relatively low mass. In one embodiment, target 302 has a mass less than about 1.00 milligrams. In another embodiment, target 302 has a mass less than about 5.0 milligrams. In yet another embodiment, target 302 has a mass less than about 10.0 milligrams. In one embodiment, the high emissivity target 302 is disposed within a supporting material to help reduce the mass of such target. Reference may be had to FIGS. 5A and 5B.

FIGS. 5A and 5B are depictions of an infrared target configuration for use with the present invention. As shown in FIG. 5A, the target 302 is disposed within supporting material 500. The surface of supporting material 500 is configured to be disposed on a patient's body, for example on the patient's arm, for a prolonged period of time. The surface of supporting material 500 is shown in more detail in FIG. 5B.

FIG. 5B is an end view of one target 302 for use with the present invention. In the embodiment depicted, target 302 is disposed within supporting material 500 such that the area of supporting material 500 is greater than the area of target 302. Supporting material 500 may be any suitable material known in the art. For example, supporting material 500 may be polyethylene, polypropylene, starched based polymers, aluminum, gold plating, and the like. A configuration such as that shown in FIG. 5 is particularly well suited for use with probes that have a large surface area, such as those illustrated in FIG. 4B and FIG. 4E. With such a configuration, a low mass target 302 can be used in those situations where a large surface area is to be covered by the probe. The target can be configured such that it insulates a section of covered skin from the effects of ambient conditions while providing a target measurement area of known emmisivity that can be measured using an infrared thermometer. A further configuration may include an infrared transparent window fixed a given distance above the target (not shown). This window would provide further isolation of the target from ambient effects while allowing the target to be read by an infrared thermometer.

Figure 6A:
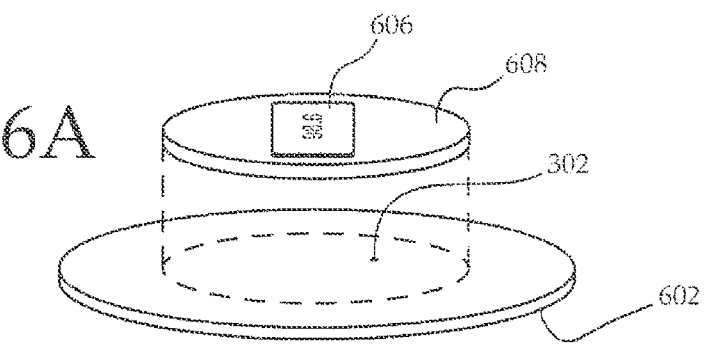
FIGS. 6A and 6B are illustrations of two infrared thermometers which have been configured for long term use.
Figure 6B:
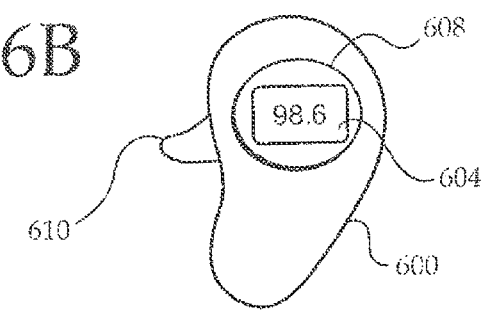

FIG. 6A and FIG. 6B show two infrared thermometers configured to be disposed on a patient for a prolonged period of time. For example, and with reference to FIG. 6A, probe 602 is configured to be adhesively attached to a patient's arm for a period of at least an hour. Infrared radiation from the patient is transferred to target 302. Such transmission may be direct conductance or by indirection transfer of infrared radiation through the air. In one embodiment, probe 602 is disposable. Infrared thermometer 608 is removably connected to probe 602 and receives emitted infrared radiation from target 302. Probe 602 may remain attached to the patient and provide continual monitoring of the patient's current temperature, simply by glancing at display 606. The configuration of probe 602 is detected by infrared thermometer 608 using the keying features previously discussed.

FIG. 6B shows an alternative assembly that uses infrared thermometer 608. Thermometer 608 is connected to probe 610 and such a probe is detected using the keying features previously discussed. In the embodiment depicted in FIG. 6B, probe 610 is a tympanic probe configured to be inserted into the ear of a patient. Probe 610 is further comprised of attachment mechanism 600 which, in the embodiment depicted, is generally in the shape of an ear. Such a configuration helps hold probe 610 in position when it is disposed in a patient's ear. Infrared thermometer 608 is removably attached to probe 610. The temperature is displayed on display 608.

Figure 7:
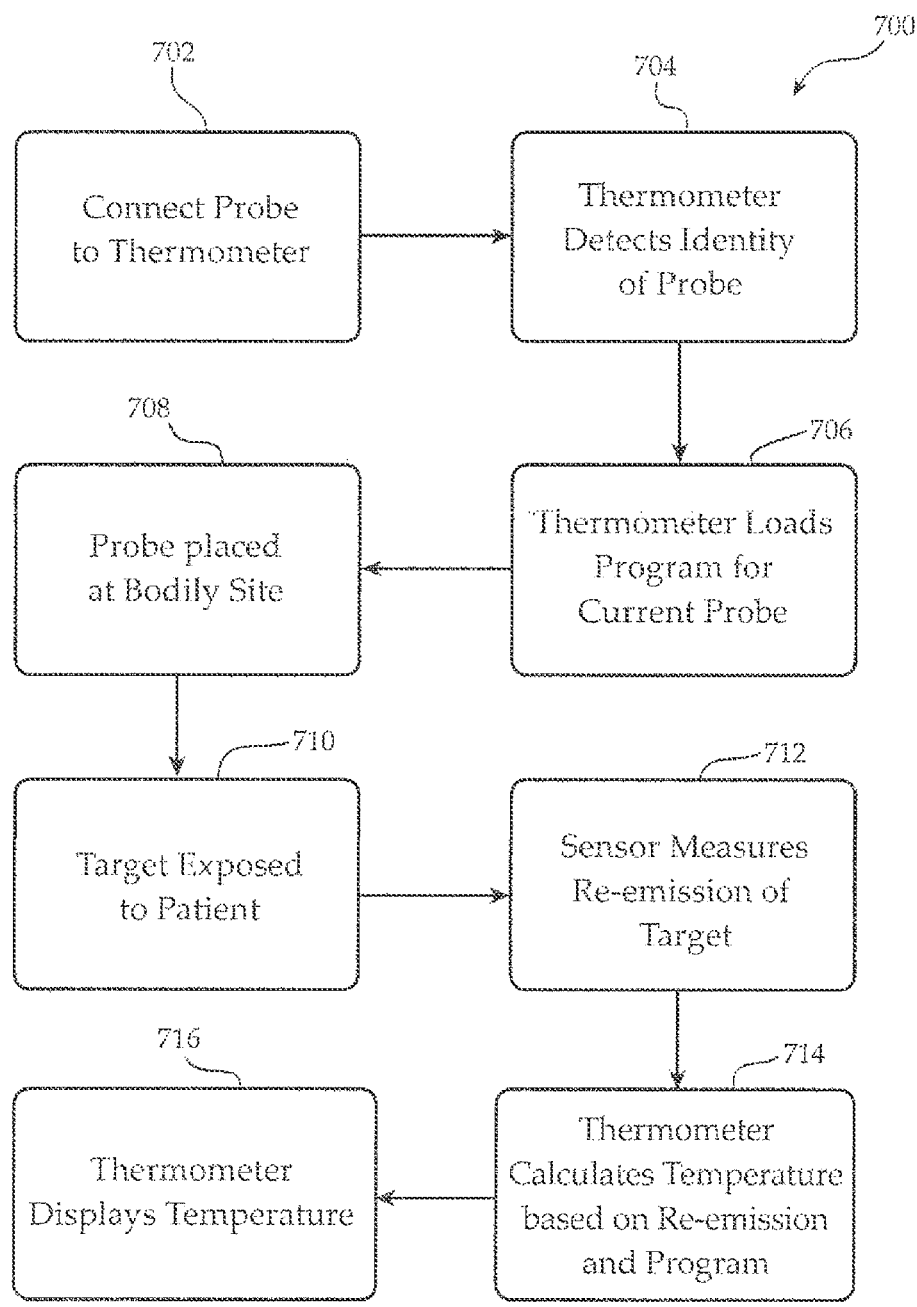
FIG. 7 is a flow diagram of one process of the invention.

FIG. 7 is a flow diagram of process 700 for use with the present invention. Process 700 is initiated by the execution of step 702 wherein a probe is connected to an infrared thermometer, thus producing an infrared thermometer assembly. This connection takes place such that a key or keying feature on the probe mates with a switch on the thermometer. In step 704, the thermometer uses this keying feature to detect the identity of the probe. For example, the thermometer might detect that the currently attached probe is a #25 tympanic probe. In step 706 the thermometer queries a data storage device located in the thermometer for a program that corresponds to the currently identified probe. This program allows the thermometer to properly interpret emitted radiation from the probe (see step 714). In step 708 the user of the thermometer places the probe at the correct bodily site. For example, of the probe is a tympanic probe, then the user places the probe in the ear cannel of the patient. In step 710 the infrared target, located within the probe, is exposed to the patient and allowed to come to thermal equilibrium with the bodily site it is exposed to. This target thereafter emits radiation that is proportional to the temperature of the bodily site to which it was previously exposed. In step 712 of process 700, an infrared sensor, disposed in the thermometer, measures the emitted radiation from the target. In step 714 the signal thus measured is processed by the thermometer in accordance with the program that was loaded in step 706. In this manner, the temperature of the aforementioned bodily site is calculated. This temperature is this displayed in step 716 to a user of the assembly.

In one embodiment, a kit is provided which comprises an infrared thermometer and at least two probes for use with the thermometer. The probes are each equipped with keying features that mate with one or more switches on the thermometer and permit the thermometer to properly identify which of the probes is currently attached. The probes are selected from the group consisting of a tympanic probe, an oral probe, a rectal probe, an axillary probe, and a temporal probe, provided that the two probes are selected from different groups. For example, the kit may comprise one tympanic probe and one oral probe. In another embodiment, at least three probes are provided which are selected from different groups. Any suitable number of probes may be so provided. In yet another embodiment, two probes or more probes are provided which are members of the same group, but which are structurally different. For example, the kit may comprise one adult tympanic probe and one neonate tympanic probe.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An infrared thermometer comprising:
a probe with an infrared target having an emissivity of at least 0.8 that receives thermal energy via conductance and infrared radiation to provide an indirect and substantially consistent source of infrared radiation, said probe further comprising at least one probe tip body having a distal end, a proximal end, an infrared opaque wall between said distal and proximal ends and a distal aperture for preventing contamination of the infrared target while permitting the reception of thermal energy by the target; and
an infrared sensor for sensing infrared radiation from the infrared target, the infrared target being positioned within one of the distal aperture and the interior of the probe tip body adjacent the distal end and axially relative to said distal aperture wherein said infrared target receives thermal energy passing through the distal aperture and thereafter emits infrared radiation from a planar rear surface of said infrared target to the infrared sensor using the infrared opaque wall of said probe tip body as a waveguide for transmission of said radiation and without intermediate optical elements between said target and said sensor.

2. An infrared thermometer comprising:
a probe with an infrared target that receives thermal energy via conductance and infrared radiation to provide an indirect and substantially consistent source of infrared radiation, said probe further comprising at least one probe tip body having a distal end, a proximal end, an infrared opaque wall and an aperture disposed in relation to said distal end for preventing contamination of the infrared target while permitting the reception of thermal energy by the infrared target; and
an infrared sensor for sensing infrared radiation from the infrared target, the infrared target being positioned within one of the aperture and within the probe tip body adjacent the distal end and axially disposed relative to said distal end such that said infrared target receives thermal energy that passes through the aperture and thereafter emits infrared radiation from a rear planar surface of said target to the infrared sensor using the infrared opaque wall of said probe tip body as a transmissive waveguide and without intermediate optical elements between said target and said sensor.

3. The infrared thermometer as recited in claim 2, wherein the infrared target comprises metal.

4. The infrared thermometer as recited in claim 2, wherein the infrared target comprises a metal foil.

5. The infrared thermometer as recited in claim 2, wherein the infrared target includes a metal selected from the group consisting of aluminum, brass, copper, and gold.

6. The infrared thermometer as recited in claim 2, wherein the aperture is infrared transparent.

7. The infrared thermometer as recited in claim 2, wherein said at least one probe tip body comprises a plurality of different probe tip bodies separably attachable to said probe.

8. The infrared thermometer as recited in claim 7, wherein said plurality of probe tip bodies include a first probe tip body configured for axillary temperature measurement and a second probe tip body configured for at least one of oral and rectal temperature measurement.

9. The infrared thermometer as recited in claim 8, wherein each of said first probe tip body and said second probe tip body are interchangeably attachable to said probe.

\* \* \* \* \*